United States Patent [19]
Bergonz

[11] 3,940,630
[45] Feb. 24, 1976

[54] VEHICLE LOCATOR
[75] Inventor: Francis H. Bergonz, Huntington Beach, Calif.
[73] Assignee: McDonnell Douglas Corporation, Long Beach, Calif.
[22] Filed: Oct. 21, 1974
[21] Appl. No.: 516,631

[52] U.S. Cl. ........... 250/568; 214/16.4 A; 250/224; 250/372; 340/23; 340/32; 340/50
[51] Int. Cl.² .................................. G08G 1/00
[58] Field of Search .......... 250/216, 566, 568, 271, 250/372, 222, 224; 340/23, 24, 32, 38 P, 50, 135, 47; 235/61.11 E; 356/51; 214/16.4 A

[56] References Cited
UNITED STATES PATENTS

| 3,130,310 | 4/1964 | Biberman et al. | 250/372 |
| 3,145,291 | 8/1964 | Brainerd | 250/568 X |
| 3,697,941 | 10/1972 | Christ | 340/23 |
| 3,701,102 | 10/1972 | Berman et al. | 340/32 X |
| 3,735,335 | 5/1973 | Kaplan et al. | 340/23 |
| 3,815,084 | 6/1974 | Pease | 340/23 |

Primary Examiner—Eli Lieberman
Assistant Examiner—E. R. LaRoche
Attorney, Agent, or Firm—G. W. Finch; W. J. Jason; D. L. Royer

[57] ABSTRACT

A system to locate selected vehicles traveling on standard streets or highways which periodically and automatically determines the location of the vehicle relative to a pre-established reference such as a map using fixed passive optical arrays as sign posts and means on the vehicles to read the sign posts and communicate the locational information thereon to a central monitoring station.

6 Claims, 7 Drawing Figures

VEHICLE LOCATOR

BACKGROUND ON THE INVENTION

Vehicle locating systems which automatically determine and make available to a central point, the positions of a group of vehicles throughout a geographic area have been based on four basic techniques: radio propogation time, proximity, dead reckoning and triangulation. However, each has disadvantages particular to the technique which has heretofore made automatic vehicle locating systems impractical.

Optical systems, such as those for sensing the motion of railroad cars past a given location have been successful but are too expensive to use when a large number of locations are to be reported for a given vehicle rather than a large number of vehicles for a given location. Also the railroad systems can not accommodate the spacing and height differences that occur when automotive vehicles are to be located.

The need for automatic vehicle monitoring systems has been increasing for vehicles such as transit buses, police vehicles and taxi fleets as well as commercial users such as package delivery services and private maintenance and home repair services. More specifically, automatic vehicle locating systems offer means for dealing with the schedule variations of transit buses by applying real-time control to the systems. With the location of each bus continuously available to the central office, schedule deviations can be computed automatically and through a return radio link, drivers can be instructed to skip a stop, wait at a stop or take other corrective action to rapidly alleviate the schedule deviation. In addition to reducing routing and schedule deviations, automatic vehicle locating systems can enable buses to be rescheduled or re-routed quickly in response to unusual conditions such as traffic emergencies or bus breakdowns.

With police vehicles normally assigned to specific control areas, there are fixed protocols that govern their response to a crime. The ability of an automatic vehicle locating system to pinpoint the location of a car can enable the police dispatcher to assign the police car closest to the location of the crime. This not only can save time in responding to a call but it also can allow the selection of a cruiser, that, although assigned to an adjacent patrol area, happens to be closer to the problem and is available to respond faster. This same general approach can be used in taxi fleets to assure that the closest available taxi is alerted in response to a call for service thereby significantly reducing the amount of non-revenue miles for the taxis.

SUMMARY OF THE INVENTION

The present vehicle locator system is intended to provide means for periodically and automatically determining and updating the locations of various vehicles traveling on standard streets or highways.

The present system includes three major subassemblies: light source transmitter means, arrays of optical reflectors located at known fixed locations along the streets and roads which will be traveled, and light detector receiver means. The transmitter and receiver subassemblies are installed on the vehicle to be located while the reflector arrays are mounted on utility or traffic control poles or other structure providing adequate vertical height and support. Individual reflectors on each array are spaced in a special pattern to achieve a unique code. The transmitter produces a sidewardly extending beam of light in a vertical plane which may be at visible or invisible wavelengths to illuminate any reflector array it passes. The receiver senses the reflected beam and decodes the information into a digital signal which is stored and accessed through the vehicle's communication system to a central console system. It is contemplated that the location information will be transmitted upon demand using interrogation techniques similar to those used in aircraft transponders. Upon interrogation, the system will automatically transmit the last location so that the position and direction of travel of the vehicle can be determined.

It is therefore an object of the present invention to provide means for automatically locating vehicles traveling along streets and highways using reflector arrays which act as sign posts.

Another object is to provide a passive sign post vehicle locator system.

Another object is to provide a sign post vehicle locator system whose sign posts are inexpensive so they can be relatively closely spaced at a reasonable cost.

Another object is to provide a vehicle locator system which is not particularly susceptible to jamming and does not attract vandalism and theft.

Another object is to provide an automatic vehicle locator system which does not interfere with existing radio or magnetic systems.

These and other objects and advantages of the present invention will become more apparent after considering the following detailed specification which covers preferred embodiments thereof in conjunction with the accompanying drawings wherein:

DESCRIPTION OF THE SHOWN EMBODIMENTS

Figure 1:
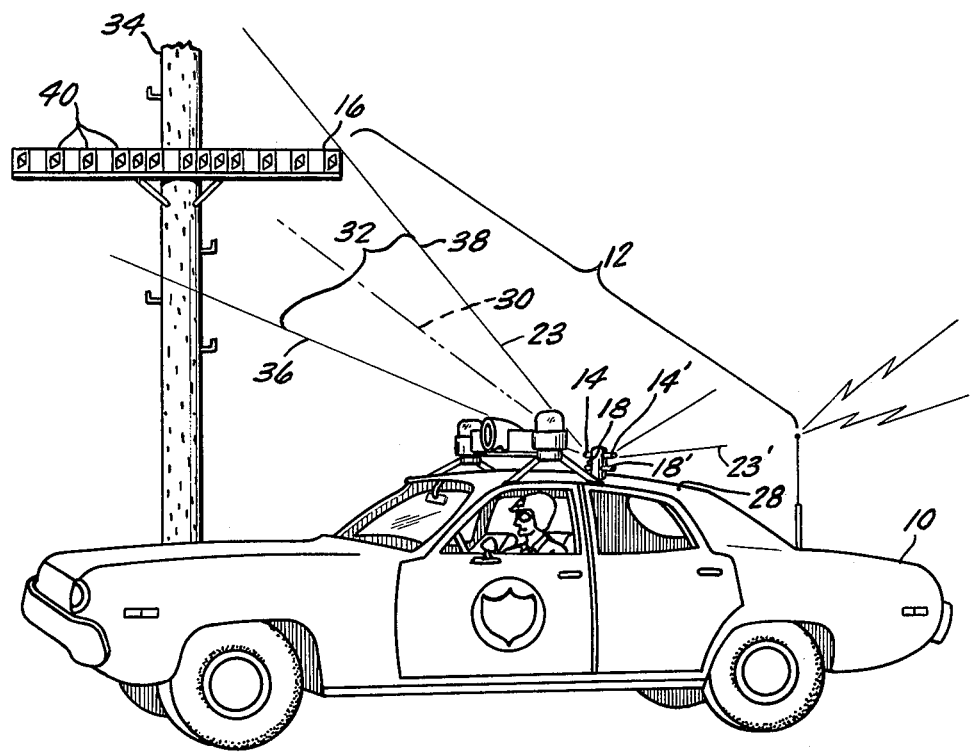
FIG. 1 is a perspective view of the present invention mounted on a police car reading a reflector array.

Referring to the drawings more particularly by reference numbers, number 10 in FIG. 1 refers to a vehicle using the automatic vehicle locator system 12 of the present invention. The system 12 includes three major subassemblies which are at least one light source transmitter 14 fixed to the vehicle, a plurality of uniquely coded reflector arrays such as array 16 and at least one light detector receiver 18 mounted to the vehicle 10 in general vertical alignment with the transmitter 14.

Figure 2:
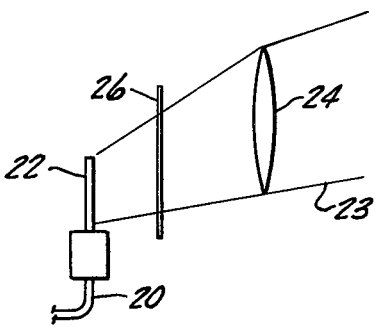
FIG. 2 is a schematic representation of a light source transmitter for the present system.

The light source transmitter 14 is shown schematically in FIG. 2 and includes a connection 20 to a power source to power a relatively high powered light source 22. The frequency at which light source 22 transmits can be visible or invisible radiation depending on environmental and other considerations present in the area in which the system 12 is to be used. For example, a light source transmitter which radiates at 2536.5 Angstroms with a band width of ± 50 Angstroms is highly advantageous in areas where fog is relatively uncommon. This wave length is unique because the upper atmosphere ozone air layer absorbs essentially all the solar ultraviolet energy at this frequency thus eliminating solar background noise. This enables the development of a very low power high signal to noise ratio system whereas certain other wave lengths are impractical because the solar background intensity would swamp any locator system signal generated. On the other hand, in areas where fog is a common occurrence and occasional high background noise can be tolerated, frequencies into the infrared are at least conceptually advantageous.

The light source 22 operates continuously when the vehicle is in motion so that no special turn-on signals are required. A mercury arc or other type lamp which has a strong ultraviolet output is especially desirable. As can be seen, the light source 22 is designed to be a vertical line source rather than a point source. This results in a vertical, fan-shaped beam 23 after projection by the transmitter optics such as lens 24 which is narrow in width and diverges within fixed limits in the vertical plane. When an ultraviolet beam 23 is being used, quartz lenses are particularly advantageous since they absorb very little radiation in the ultraviolet portion of the spectrum. The beam 23 from the light source 22 is filtered either before, after, or during the time the 23 beam is shaped by the optics by means of a filter 26 which is designed to pass a narrow band of frequencies having a predetermined center frequency. This allows the use of a frequency sensitive detector as will be discussed hereinafter.

It is usual that the light source transmitter 14 be located on a top surface of the vehicle 10 such as the hood, trunk lid or roof 28 as shown. It is oriented so that the beam 23 points generally 90° from the direction of travel of the vehicle toward the right side of the roadway. The elevation center line 30 and the vertical width angle 32 of the beam 23 are chosen so that reflector arrays 16 will be painted thereby when the vehicle 10 passes no matter which lane of traffic the vehicle 10 is in.

In FIG. 1, the reflector array 16 is shown mounted to a utility pole 34 at a sufficient height to avoid vandalism and to be illuminated by the lower limits 36 of the beam 23 when the vehicle is in the inside lane, or in an optional embodiment across the street, without interference from most intervening vehicles. The array 16 is also mounted low enough so that the upper edge 38 of the beam 23 will illuminate the array 16 when the vehicle 10 is in the lane adjacent the array 16. The array 16 itself is oriented along the expected path of the vehicle 10 with the long dimension of the array parallel to the curb. The array 16 includes a plurality of reflectors such as the cube corner retroreflector 40 shown. The reflectors 40 which can be protected from weather and debris by means such as the hood 42 are present on the array 16 in a coded form, that is, their position in the array is in accordance with a predetermined digital code. The code of the array 16 shown being 101010111110111010101. It is usually required that start and stop codes such as 10101 be included at both ends of the array 16. This enables the system 12 to sense the speed of the vehicle 10 passing the array 16 so that the information contained in the positions and spacing of the other reflectors 40 can be decoded. The start and stop codes also enable logic circuits to determine the validity and perform a parity check of the sensed signal from the array 16.

It has been found that economical retroreflectors 40 can be constructed by molding the well-known cube corner shapes into a plastic block whose surface is then coated with aluminum. This type of retroreflector will work well with just about any frequency of light whereas ultraviolet radiation would be absorbed if it was required to pass through the plastic. Ultraviolet radiation is also absorbed by some other normally reflective coatings. By making the reflector 40 out of quartz, this tendency to absorb ultraviolet light can be overcome, however, the use of quartz is a more expensive solution than front surface coating.

Figure 4:
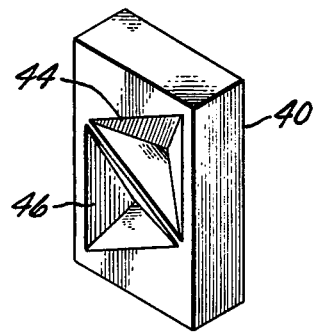
FIG. 4 is an isometric view of a retro-reflector element for the reflector array sign post shown in FIG. 1.
Figure 3:
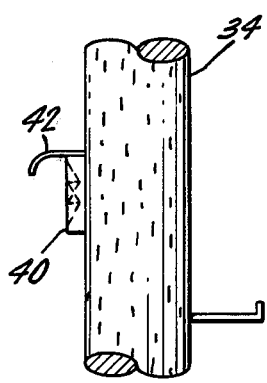
FIG. 3 is an enlarged cross-sectional view of the array of FIG. 1 mounted on a utility pole.

As can be seen in FIG. 4, the reflector 40 includes two reflectors elements 44 and 46 oriented 180° with respect to each other so that a constant vertical area of reflector element surface is available to reflect the beam 23 as it sweeps across the reflector 40 due to the movement of the vehicle 10. Although two retroreflectors are not necessarily required, it is convenient since they tend to produce square pulses of reflected light which are easier to detect from background noise. It is a characteristic of retroreflectors such as the cube corner reflector elements 44 and 46 shown that they return a beam in a direction parallel to the incident beam. This means that when the vehicle transmitter 14 is adjacent to the reflector array 16, the beam 23 will be returned back to the vehicle 10 where it can be detected by the light detector receiver 18. The use of retroreflectors 40 also enables the vehicle 10 and its light beam 23 to be at a substantial angle both vertically and horizontally from the array 16 and still have the beam reflected back toward the light detector receiver 18.

Figure 5:
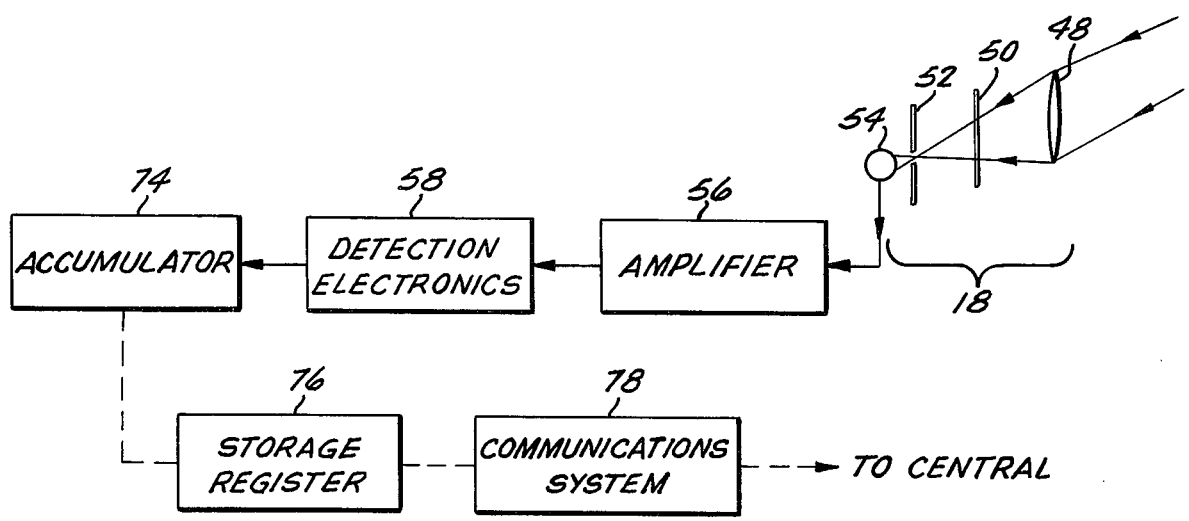
FIG. 5 is a schematic diagram of the light detector receiver and its associated equipment for the present system.

The light detector receiver 18 is shown diagramatically with its associated components in FIG. 5. The light detector receiver 18 includes an optical system such as one or more lens 48. The light reflected and returned to the detector receiver 18 is collected with the lens 48 and passed through a filter 50 which can be a narrow band filter allowing passage only of the desired portion of the frequency spectrum to screen out background light. The reflected light is then passed through a narrow slit 52 which serves as a stop to limit the horizontal field of view of the detector receiver 18. The horizontal field of view is chosen to be less than the width of one reflector 40 so that simultaneous reception of radiant energy from more than one reflector 40 cannot occur. The vertical field of view, however, is large enough to accommodate the variable street width and height array conditions which exist in the area of interest.

Figure 6:
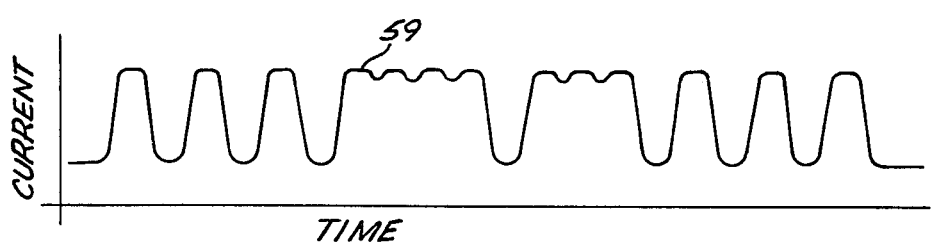
FIG. 6 is a chart of the signal input to the amplifier of FIG. 5 when the vehicle of FIG. 1 moves past the array of FIG. 1 at a relatively constant speed and, FIG. 7 is a diagram of an integrate and dump detector used in the detection electronics of FIG. 5.
Figure 7:
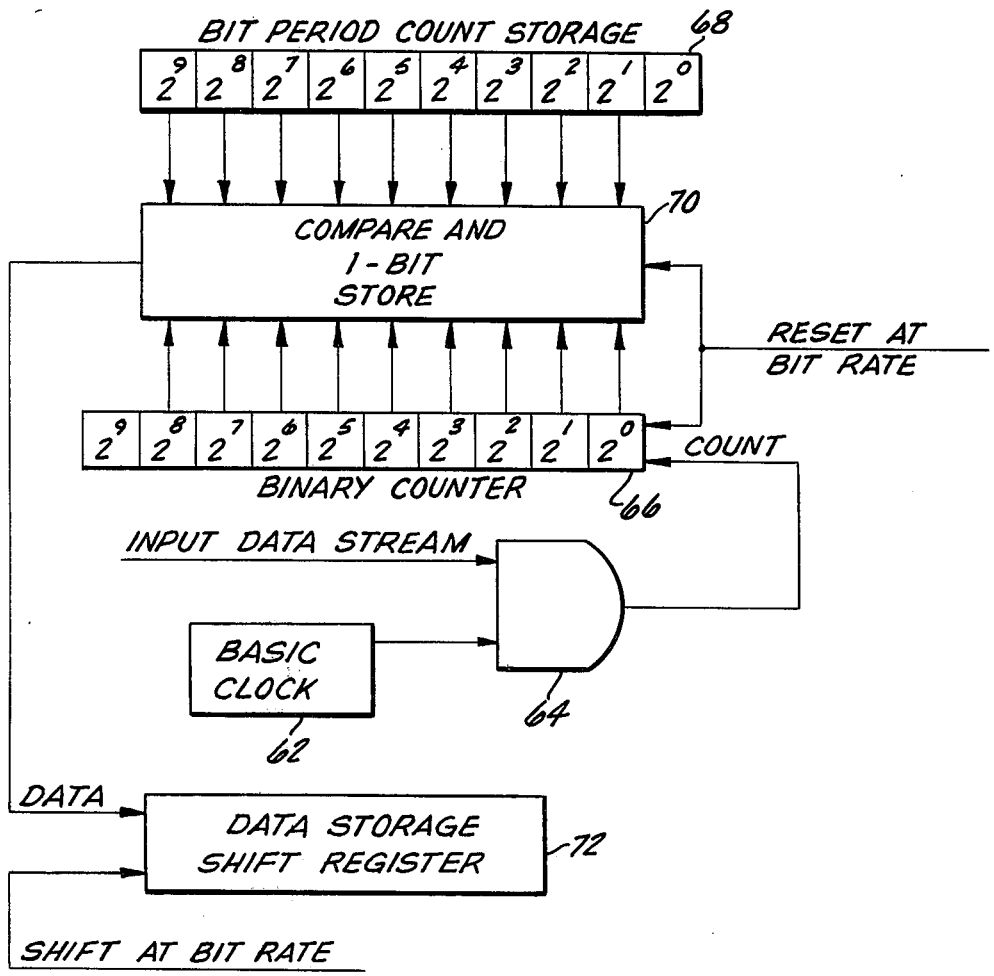

The filtered light passing through the slit 52 is focused on a photo cell 54 where it is detected and converted to an electrical signal which is transmitted to an amplifier 56 for increasing the signal level a suitable amount compatible with the detection electronics 58. A signal 59 typical of those passed between the amplifier 56 and the detection electronics 58 is shown in FIG. 6. The signal 59 contains the code indicator that the vehicle is passing the array 16 of FIG. 1. It should be realized that the amplitude, the shaping and the timing of the pulses of signal 59 can vary depending upon the environmental conditions, the distance that vehicle 10 is away from the reflector array 16 and the speed of the vehicle 10 passing the array 16. Therefore, the detection electronics 58 include an integrate and dump detector 60 shown in FIG. 7 to enhance tolerance to noise and imperfect synchronization. In the operation of the integrate and dump circuit 60, output pulses from a clock 62 and the amplifier 56 are fed to an AND gate 64 which gates pulses from the clock 62 into a binary counter, the clock pulses being substantially more frequent than the pulses in the input data stream. The counter 66 is reset at the beginning of each bit period. In the ideal case, the contents of the counter 66 would be zero for a 0 and would be equal to the measured counts per period determined by synchronization circuitry for a 1. As the real system 12 departs from the ideal due to noise or synchronization imperfections, a few counts will accumulate in the counter 66 for a 0 and less than a full count will accumulate in the counter 66 for a 1. To make a decision if a bit is a 1 or a 0, the contents of the counter 66 are compared to the contents of the bit period storage register 68 by means of a comparator 70. Note that the $2^i$ position of the counter is compared with the $2^{i+1}$ position of the referenced bit period count storage register 68. With this arrangement the comparator 70 has an output when the counter counts up to a number one-half that stored in the bit period count storage register 68. Operation is such that if the count for a bit period is less than one-half the stored reference, a 0 is shifted from the comparator 70 into a data storage register 72 and if the count equals or exceeds one-half the stored reference a 1 is shifted into the data storage register 72. Accommodation of a range of bit rates is therefore automatically achieved by storing the proper binary number in the register 68.

Since all reflector arrays have a start code such as 10101, this characteristic is used to provide the means to identify signals from a reflector array, adjust the bit rates and reject spurious random reflections which may enter the receiver 18. A similar end of message 10101 code can also be used. The identifying is done in the accumulator 74. As the vehicle 10 passes the array 16, the first pulse is processed as described and stored in the accumulator 74. If a second pulse doesn't arrive shortly after the first pulse, at an interval dependent on vehicle speed, then some object other than an array 16 has reflected or provided the original signal. In order to overcome this situation the accumulator 74 is cleared after a short period of time if a second signal does not arrive. A typical time can be 0.05 seconds for a minimum vehicle velocity of 1 mph (1.61 kph) and a 1 inch (2.54 centimeters) spacing of the reflectors. The time interval selected is based on the expected minimum vehicle velocity and the reflector spacing.

The other type of false signal that can be received is a continuous or near continuous one again indicating a source other than the array 16. Logic in the detection electronics 58 can be used to reject these signals by establishing a minimum time interval criteria for acceptable start signals. For vehicle speeds up to 80 mph (128.8 kph) and 1 inch (2.54 centimeter) reflector spacing, the minimum time interval is $7.1 \times 10^{-4}$ seconds. All signals received in an interval shorter than this are rejected. If a continuous signal persists for a predetermined time indicating the source is probably the sun, a unique code can be generated to alert the central office.

Once the accumulator 74 has acquired a complete count, a parity check can then be run on the data. If the check is good the data is released for storage in a storage register 76 associated with the communication system 78 present in the vehicle 10. Means can be provided in the communication system similar to those used in transponders for release of the data via the communications system when integrated by a central control. If the parity check is bad, the accumulator 74 is cleared so that the last valid information is continued to be stored in the storage register 76 for transmission if the vehicle 10 happens to be interrogated.

Since the reflector arrays are relatively economical it is contemplated that they be placed at about tenth of a mile intervals throughout the area to be covered. This can be reduced somewhat if a dual transmitter receiver is used such as shown in FIG. 1 wherein a second beam 23' is projected to the left side of the vehicle 10 for reading arrays placed on the left side of the road. Of course the reflector array codes reflected back from beam 23' will be reversed from that along the right side of the road which can be accommodated by the codes on the arrays 16 or since a separate receiver light detector receiver 18 prime is used, the code can be reversed electronically by means of wellknown techniques.

Although the above discusses the preferred embodiment where light or the absence of light is detected, different reflected wavelengths and different polarizations of reflected light can also be used in the sensing means for the present invention.

Thus, there has been shown and described novel means for automatically locating the position of vehicles in a given geographical area which fulfill all the objects and advantages sought therefor. Many changes, alterations and other uses and applications of the subject locator system will become apparent to those skilled in the art after considering this specification and the accompanying drawings. All such changes, modifications, variations and other uses and applications which do not depart from the spirit and scope of this invention are deemed to be covered by the invention which is limited only by the claims which follow.

What is claimed is:

1. A system for locating at least one movable vehicle at predetermined locations comprising:
   a plurality of reflective arrays, each array including a plurality of reflectors in a coded pattern and being located at a predetermined location adjacent a path for the vehicle along which the location of the vehicle is to be determined, each array having a predetermined start code;
   a transmitter on the vehicle including means for producing at least one beam of radiant energy at ultraviolet frequencies, said transmitter beam having a vertically oriented fan shape which extends outwardly from the side of the vehicle to impinge and be reflected in accordance with said coded pattern by an array as the vehicle passes along the path; and
   a receiver on the vehicle including detector means to detect said coded pattern of reflected radiant energy from an array, said detector means being positioned in a vertical plane with respect to said transmitter beam producing means and including optical means for focusing said reflected radiant energy, filter means which pass only said ultraviolet frequencies, a detector element to convert said filtered radiant energy into electrical signals, means positioned between said detector element and said array to restrict the view of said detector element to one reflector at a time, means connected to said detector means to sense said start code including means to accommodate a predetermined range of bit rates, means to store said array code upon being enabled by said start code sensing means, and means to transmit said array code which indicates the predetermined location of said vehicle.

2. The system defined in claim 1 wherein said means to sense said start code include an integrate and dump circuit to determine whether or not a reflector is being sensed.

3. The system defined in claim 1 wherein said transmitter includes second beam producing means which produce a second beam radiant energy which extends outwardly from said vehicle in a direction relative to the path opposite to said other beam to illuminate arrays which happen to be on the opposite side of the vehicle's path and wherein said receiver includes second beam detecting means to detect said coded pattern of said second beam's reflected radiant energy from an array.

4. The system defined in claim 1 wherein at least a main portion of said radiant energy has a wave length between 2486.5 and 2586.5 Angstroms.

5. The system defined in claim 1 wherein said array is divided into a predetermined number of sections positioned therealong, said sections having a predetermined length and some of said sections including retroreflectors to produce said coded pattern having predetermined reflection characteristics.

6. The system defined in claim 5 wherein each of said reflectors are retroreflectors comprised of a pair of cube corner reflector elements oriented at 180° to each other and in vertical alignment, said cube corner reflector elements being coated with reflective material on the front surface thereof.

* * * * *